Patented Dec. 26, 1933

1,940,811

UNITED STATES PATENT OFFICE 1,940,811

METHOD OF RECRYSTALLIZING AND PURIFYING TETRYL

William H. Rinkenbach and Eugene D. Regad, Dover, N. J.

No Drawing. Application January 27, 1932
Serial No. 589,322

4 Claims. (Cl. 260—128)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a method of recrystallizing and purifying tetryl.

In treating tetryl the usual practice is to employ benzene as the solvent medium. Benzene retains 11% of its weight at 20° C. and has a solvent power of 24% of its weight at 80° C. I have discovered that ethylene dichloride, when used as a solvent for tetryl, retains only 4% of its weight at 20° C. and has a solvent power of 65% of its weight at 80° C.

In practice, these differences have been found to permit a recrystallization recovery of 55 grams of tetryl per 100 grams of ethylene dichloride, as compared with a recovery of 12 grams of tetryl per 100 grams of benzene. Furthermore, when the difference between the specific gravities of the solvents is considered, the value of ethylene dichloride is enhanced by a proportionate amount; inasmuch as the recovery per unit volume of plant capacity is 6.3 times that obtained with benzene.

Tetryl recrystallized from ethylene dichloride has been found to consist largely of individual crystals which are not as difficult to control with respect to size as are the spherical aggregates of small crystals obtained from benzene. These individual crystals flow freely, do not have the tendency to break up and "dust" shown by the aggregates, and can be used to produce pellets of satisfactory densities by means of a pelleting press.

In contrast to benzene, ethylene dichloride readily dissolves wet tetryl. This is a considerable advantage in plant practice.

In purifying tetryl by recrystallization from benzene, it has been found necessary to filter the hot solution in order to remove the "benzene insoluble" usually present. This compound dissolves in ethylene dichloride and is retained by the mother liquor; so that the necessity of filtration is removed by the use of ethylene dichloride but no decrease in the purification is effected by this economical abbreviation of the process.

Benzene is a volatile liquid which is readily ignited, supports combustion, and represents a fire hazard. Ethylene dichloride can be ignited but does not support combustion.

The toxic properties of benzene are so objectionable as to have led to the enactment of laws forbidding or controlling its use in industrial processes where workers are exposed to the vapors. Ethylene dichloride, however, appears to have no toxic effects and its use should result in economies due to less elaborate installations of equipment designed to protect workers.

A preferred method of purifying tetryl consists in dissolving tetryl in about 1.7 times its weight of ethylene dichloride at 80° C., allowing the solution to cool to about 20° C., and then removing the solvent. These temperatures and proportion of solvent and solute may be varied.

We claim:

1. The method of recrystallizing tetryl which consists in dissolving tetryl in substantially 1.7 times its weight of ethylene dichloride at about 80° C., allowing the solution to cool to about 20° C., and removing the solvent.

2. The method of recrystallizing tetryl which consist in dissolving tetryl in ethylene dichloride at 80° C., allowing the solution to cool to about 20° C., and removing the solvent.

3. In a method of recrystallizing tetryl the step which consists in dissolving tetryl in ethylene dichloride.

4. A method of recrystallizing tetryl which consists in dissolving tetryl in hot ethylene dichloride, allowing the solution to cool and removing the solvent.

WILLIAM H. RINKENBACH.
EUGENE D. REGAD.